United States Patent
Sempuku

(10) Patent No.: US 9,852,632 B2
(45) Date of Patent: Dec. 26, 2017

(54) DRIVING ASSISTANCE DEVICE AND DRIVING ASSISTANCE METHOD

(75) Inventor: Tsuyoshi Sempuku, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 780 days.

(21) Appl. No.: 14/370,432

(22) PCT Filed: Feb. 10, 2012

(86) PCT No.: PCT/JP2012/000913
§ 371 (c)(1),
(2), (4) Date: Jul. 2, 2014

(87) PCT Pub. No.: WO2013/118191
PCT Pub. Date: Aug. 15, 2013

(65) Prior Publication Data
US 2015/0015712 A1    Jan. 15, 2015

(51) Int. Cl.
*G08G 1/16*    (2006.01)
*G06K 9/00*    (2006.01)
*H04N 7/18*    (2006.01)

(52) U.S. Cl.
CPC .......... *G08G 1/16* (2013.01); *G06K 9/00805* (2013.01); *G08G 1/165* (2013.01); *G08G 1/166* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 2003/0210807 A1 | 11/2003 | Sato et al. | |
| 2007/0076526 A1* | 4/2007 | Aikyo | G01S 15/003 367/128 |
| 2007/0106475 A1* | 5/2007 | Kondoh | B60K 26/021 701/301 |
| 2011/0075904 A1 | 3/2011 | Yoshikawa et al. | |
| 2011/0205353 A1* | 8/2011 | Fujisawa | H01J 37/222 348/80 |
| 2012/0300078 A1 | 11/2012 | Ogata et al. | |

FOREIGN PATENT DOCUMENTS

| | | |
|---|---|---|
| JP | 2003-81039 A | 3/2003 |
| JP | 2004-56763 A | 2/2004 |
| JP | 2005-346177 A | 12/2005 |

(Continued)

*Primary Examiner* — Kevin McInnish
(74) *Attorney, Agent, or Firm* — Birch, Stewart, Kolasch & Birch, LLP

(57) ABSTRACT

Herein provided are an object detection section 2 that detects an object existing in a periphery of an own vehicle from a periphery image acquired by a video sensor 1; a risk degree calculation section 4 that calculates a degree of risk that the own vehicle collides with the object detected by the object detection section 2; and a collision-risk target setting section 5 that sets the object detected by the object detection section 2 as a collision-risk target on the basis of the degree of risk calculated by the risk degree calculation section 4, and a warning image determination section 6 determines a size of a rectangle that encompasses the collision-risk target set by the collision-risk target setting section 5, according to the degree of risk calculated by the risk degree calculation section 4.

18 Claims, 6 Drawing Sheets

(56) References Cited

FOREIGN PATENT DOCUMENTS

| | | |
|---|---|---|
| JP | 2006-151114 A | 6/2006 |
| JP | 2007-69806 A | 3/2007 |
| JP | 2007-87337 A | 4/2007 |
| JP | 2008-3762 A | 1/2008 |
| JP | 2009-40108 A | 2/2009 |
| JP | 2010-234851 A | 10/2010 |
| JP | 2011-154580 A | 10/2010 |
| WO | WO 2009/110308 A1 | 9/2009 |

* cited by examiner (a)

(b)

(c)

(d)

DRIVING ASSISTANCE DEVICE AND DRIVING ASSISTANCE METHOD

TECHNICAL FIELD

The present invention relates to a driving assistance device and driving assistance method for informing a driver of a collision risk.

BACKGROUND ART

Heretofore, as this kind of driving assistance devices, there are devices that make notification of a collision risk.

For example, there have been known such devices that display collision-risk notification information on an instrument panel of a vehicle or a monitor of a car navigation system.

Further, there has been known a head-up display that displays collision-risk notification information on a front window of a vehicle as being overlapped with a landscape ahead thereof.

In any of these driving assistance devices, collision-risk targets, such as a pedestrian, a vehicle and the like, are detected by a camera, a millimeter-wave sensor, or the like, so that information about the collision-risk targets such as a pedestrian and the like is warningly displayed.

For example, according to a driving assistance device disclosed in Patent Document 1, the warning display is made using a head-up display in such a manner that the collision-risk target such as a pedestrian or the like is encompassed with a rectangle.

In addition, when there are a plurality of collision-risk targets, a brightness of the rectangle that has most to be known is increased for the driver.

That is, in order to direct the driver's eyes to the collision-risk target, the brightness of the rectangle is adjusted depending on the degree of importance of the collision-risk target.

PRIOR ART DOCUMENT

Patent Document

Patent Document 1: Japanese Patent Application Laid-open No. 2007-87337 (paragraph numbers [0013] and [0048], FIG. 1, FIG. 5)

SUMMARY OF THE INVENTION

Problems to be Solved by the Invention

Since the conventional driving assistance devices are configured as described above, the brightness of an image for marking the collision-risk target with a highest degree of importance is adjusted to a highest value; however, the rectangle that encompasses the collision-risk target is set to be larger in size as the image of the collision-risk target becomes larger, irrespective of the distance to the own vehicle. For this reason, even when the distance to the own vehicle is long and thus the collision risk is low, if the size of the collision-risk target is large (for example, a motor-coach), a large-size rectangle is displayed, whereas even when the distance to the own vehicle is short and thus the collision risk is high, if the size of the collision-risk target is small (for example, a pedestrian), a small-size rectangle is displayed. In this situation, there is a problem such that the driver's eyes are directed to the collision-risk target of the low collision risk.

The present invention is made to solve the foregoing problems, and an object of the invention is to provide a driving assistance device and driving assistance method that can precisely inform the driver of the presence of an object of a high collision risk.

Means for Solving the Problems

A driving assistance device according to the invention is provided with: an image acquisition unit that acquires a periphery image of an own vehicle; an object detection unit that detects an object existing in a periphery of the own vehicle from the periphery image acquired by the image acquisition unit; a risk degree calculation unit that calculates a degree of risk that the own vehicle collides with the object detected by the object detection unit; a collision-risk target setting unit that sets the object detected by the object detection unit as a collision-risk target on the basis of the degree of risk calculated by the risk degree calculation unit; a warning image determination unit that determines a size of a warning image that is an image for marking the collision-risk target set by the collision-risk target setting unit, according to the degree of risk calculated by the risk degree calculation unit; and an image display unit that displays the warning image having the size determined by the warning image determination unit at a position where the collision-risk target set by the collision-risk target setting unit exists, wherein when a plurality of the collision-risk targets are set by the collision-risk target setting unit and the warning images for marking the plurality of collision-risk targets are to be displayed at their overlapping positions, the warning image determination unit modifies a shape of the warning image for marking the collision-risk target that is lower than the other target in the degree of risk calculated by the risk degree calculation unit.

Effect of the Invention

According to the present invention, it is configured to include the image acquisition unit that acquires a periphery image of an own vehicle; the object detection unit that detects an object existing in a periphery of the own vehicle from the periphery image acquired by the image acquisition unit; the risk degree calculation unit that calculates a degree of risk that the own vehicle collides with the object detected by the object detection unit; the collision-risk target setting unit that sets the object detected by the object detection unit as a collision-risk target on the basis of the degree of risk calculated by the risk degree calculation unit; the warning image determination unit that determines a size of a warning image that is an image for marking the collision-risk target set by the collision-risk target setting unit, according to the degree of risk calculated by the risk degree calculation unit; and the image display unit that displays the warning image having the size determined by the warning image determination unit at a position where the collision-risk target set by the collision-risk target setting unit exists, wherein when a plurality of the collision-risk targets are set by the collision-risk target setting unit and the warning images for marking the plurality of collision-risk targets are to be displayed at their overlapping positions, the warning image determination unit modifies a shape of the warning image for marking the collision-risk target that is lower than the other target in the degree of risk calculated by the risk degree calculation unit. Thus, there is an advantageous effect such that a driver can be precisely informed of the presence of an object of a high collision risk.

BEST MODE FOR CARRYING OUT THE INVENTION

Hereinafter, in order to describe the present invention in more detail, embodiments for carrying out the invention will be described with reference to the accompanying drawings.

Embodiment 1

Figure 1:
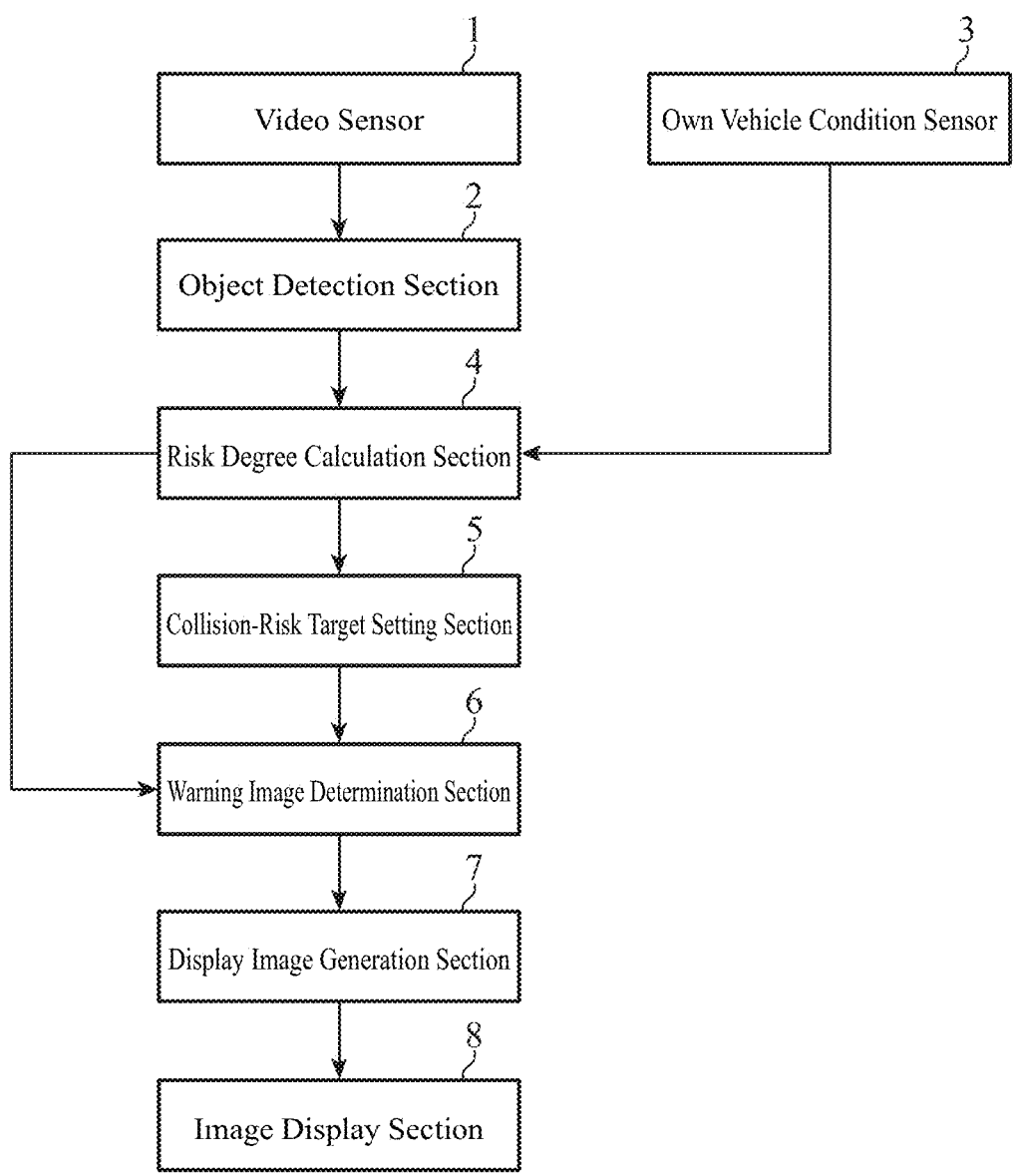
FIG. 1 is a configuration diagram showing a driving assistance device according to Embodiment 1 of the present invention.

FIG. 1 is a configuration diagram showing a driving assistance device according to Embodiment 1 of the invention. In FIG. 1, a video sensor 1 is an imaging device for acquiring a periphery image of an own vehicle, corresponding examples of which include an image sensor that receives visible light, an infrared camera, a millimeter-wave radar, and the like. Note that the video sensor 1 constitutes an image acquisition unit.

Although the video sensor 1 is assumed to be the image sensor in this Embodiment 1, it may be any sensor as long as capable of measuring a periphery condition of the own vehicle as an image or converting the condition numerically.

Further, an image acquired by the video sensor 1 is not limited to that ahead of the vehicle, and may be a rear or side image.

For example, when the image of the rear side or lateral side of the vehicle is used, the invention can be applied to a back monitor for displaying the rear side of the vehicle.

An object detection section 2 is configured, for example, with a CPU-mounted semiconductor integrated circuit, a one-chip microcomputer or the like, and performs detection processing of an object existing in the image acquired by the video sensor 1.

That is, the object detection section 2 detects an object in such a manner of searching a closed area from the image data indicative of the image acquired by the video sensor 1 by extracting an amount of characteristic (feature) such as a color, an edge line or the like; calculating, when the closed area is found, probability indicating the likelihood of the area being an object; and determining the area, if the probability is higher than a predetermined threshold value, to be an area that the object occupies.

An own vehicle condition sensor 3 is a sensor that performs sensing an own vehicle speed, a steering angle, a winker condition, a gear condition, a wiper condition, etc.

A risk degree calculation section 4 is configured, for example, with a CPU-mounted semiconductor integrated circuit, a one-chip microcomputer or the like, and performs processing of calculating a degree of risk that the own vehicle collides with the object detected by the object detection section 2.

For example, the risk degree calculation section predicts from a distance and a relative speed between the object detected by the object detection section 2 and the own vehicle, a time up to the collision of the own vehicle with the above object, and calculates a higher degree of risk as the time predicted becomes shorter.

Note that a risk degree calculation unit is configured with the own vehicle condition sensor 3 and the risk degree calculation section 4.

A collision-risk target setting section 5 is configured, for example, with a CPU-mounted semiconductor integrated circuit, a one-chip microcomputer or the like, and performs processing of setting the object detected by the object detection section 2 as a collision-risk target on the basis of the degree of risk calculated by the risk degree calculation section 4. Note that the collision-risk target setting section 5 constitutes a collision-risk target setting unit.

A warning image determination section 6 is configured, for example, with a CPU-mounted semiconductor integrated circuit, a one-chip microcomputer or the like, and performs processing of determining a size of a warning image that is an image for marking the collision-risk target set by the collision-risk target setting section 5 (for example, a size of a rectangle (frame) encompassing the collision-risk target), according to the degree of risk calculated by the risk degree calculation section 4.

That is, the warning image determination section 6 makes larger the size of the warning image (for example, a size of a rectangle (frame) encompassing the collision-risk target) as the degree of risk calculated by the risk degree calculation section 4 becomes higher.

Note that the warning image determination section 6 constitutes a warning image determination unit.

A display image generation section 7 is configured, for example, with a CPU-mounted semiconductor integrated circuit, a one-chip microcomputer or the like, and performs processing of superimposing the warning image (for example, a rectangle) with the size determined by the warning image determination section 6 on the image acquired by the video sensor 1 at a position where the collision-risk target determined by the collision-risk target setting section 5 exists, to thereby generate a display image (an image in which a rectangle is superimposed at the position where the collision-risk target exists).

An image display section 8 is configured, for example, with a GPU (Graphics Processing Unit) or the like, and performs processing of displaying the display image generated by the display image generation section 7 on a display (for example, an instrument panel or a monitor of a car-navigation system).

Note that an image display unit is configured with the display image generation section 7 and the image display section 8.

In the case of FIG. 1, it is assumed that the configuration elements of the driving assistance device i.e. the video sensor 1, the object detection section 2, the own vehicle condition sensor 3, the risk degree calculation section 4, the collision-risk target setting section 5, the warning image determination section 6, the display image generation section 7 and the image display section 8, are configured with their respective dedicated pieces of hardware; however, the driving assistance device may be configured by a computer.

When the driving assistance device is configured by a computer, it suffices to store in a memory of the computer, a program that describes processing contents of the video sensor 1, the object detection section 2, the own vehicle condition sensor 3, the risk degree calculation section 4, the collision-risk target setting section 5, the warning image determination section 6, the display image generation section 7 and the image display section 8, and then to cause a CPU in the computer to implement the program stored in the memory.

Figure 2:
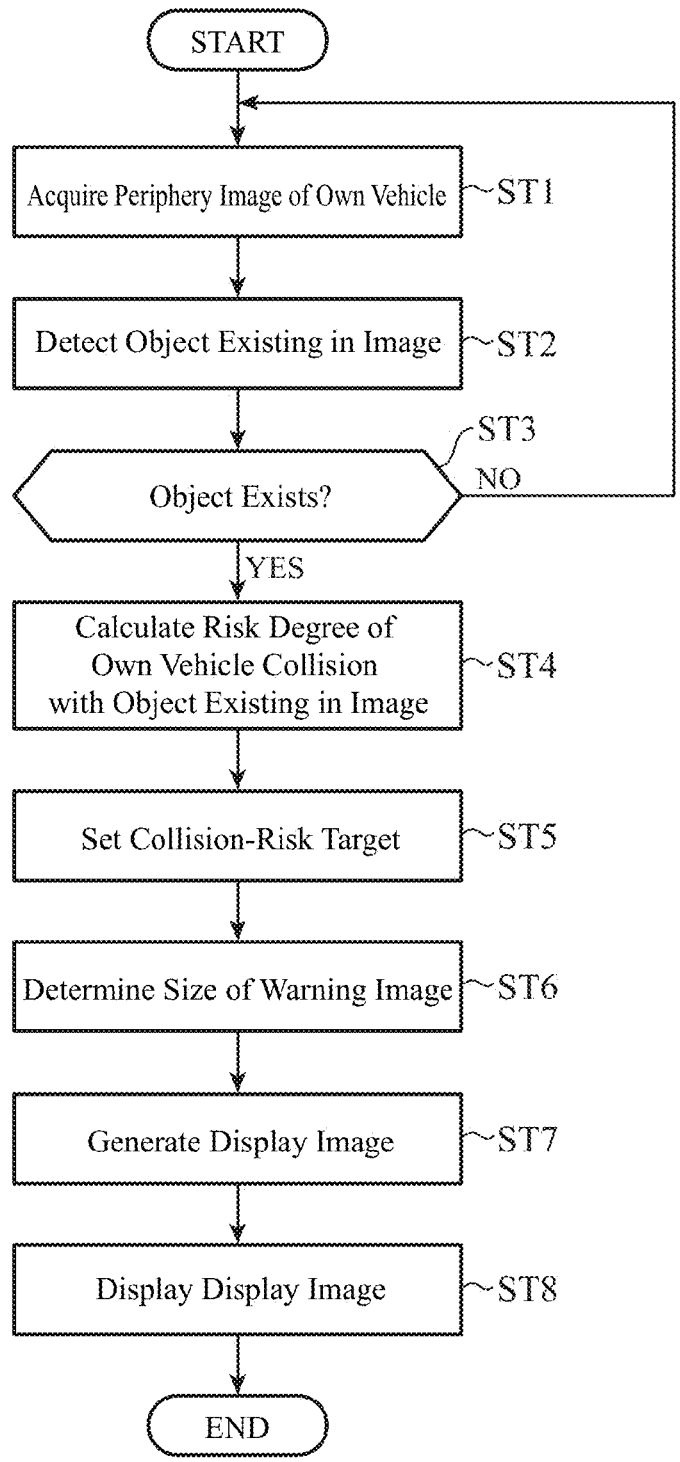
FIG. 2 is a flowchart showing processing contents of the driving assistance device (driving assistance method) according to Embodiment 1 of the invention.

FIG. 2 is a flowchart showing processing contents of the driving assistance device (driving assistance method) according to Embodiment 1 of the invention.

Next, an operation thereof will be described.

First, the video sensor 1 acquires a periphery image of the own vehicle, and outputs image data indicative of the image to the object detection section 2 (Step ST1).

Although the image acquired by the video sensor 1 is not limited to that ahead of the vehicle and may be a rear side or lateral side image, in Embodiment 1, a description will be made assuming that an image ahead of the vehicle is acquired.

When the video sensor 1 acquires the periphery image of the own vehicle, the object detection section 2 detects an object existing in the image (Step ST2).

That is, the object detection section 2 searches a closed area from the image data indicative of the image acquired by the video sensor 1 by extracting an amount of characteristic such as a color, an edge line or the like.

When there is the closed area, the object detection section 2 calculates probability indicating the likelihood of the area being an object, and if the probability is higher than a predetermined threshold value, determines the area to be an area that the object occupies, to thereby detect the object.

Here is shown a method of detecting an object by comparing the probability indicating the likelihood of the area being an object; however, the method is not limitative. For example, such a method is instead conceivable that similarity is determined between the closed area and a pre-registered object shape (for example, shape of a passenger vehicle, a truck, a human or the like), to thereby detect an object.

The object detection section 2, when detecting an object existing in the image, outputs the detection result to the risk degree calculation section 4; however, if detecting no object existing in the image, returns to the process in Step ST1 (Step ST3), to thereby perform processing of detecting an object existing in another image acquired by the video sensor 1.

When the object detection section 2 detects an object existing in the image, the risk degree calculation section 4 calculates a degree of risk that the own vehicle collides with the object (Step ST4).

For example, the risk degree calculation section 4 predicts from a distance and a relative speed between the object detected by the object detection section 2 and the own vehicle, a time up to the collision of the own vehicle with the above object, and calculates a higher degree of risk as the time predicted becomes shorter.

The distance between the object detected by the object detection section 2 and the own vehicle can be measured from a parallax if two infrared cameras, for example, are used as the video sensor 1.

The relative speed between the object and the own vehicle can be calculated from a timewise change of the distance between the object and the own vehicle.

Here is shown the case where the risk degree calculation section 4 predicts the time up to the collision of the own vehicle with the object, and calculates a higher degree of risk as the time predicted becomes shorter; however, this case is not limitative, and the degree of risk may be calculated, for example, in a following manner.

That is, the risk degree calculation section 4 analyzes actions of the object detected by the object detection section 2 and the own vehicle, to thereby predict moving directions of the object and the own vehicle.

The moving directions of the object detected by the object detection section 2 and the own vehicle can be predicted by taking into consideration the trajectories of the object and the own vehicle, a road configuration stored in a map database, a steering angle which is a sensing result of the own vehicle condition sensor 3, or the like.

Although the prediction processing of the moving directions is itself a publically known technique and thus its detailed description is omitted here, it is noted that the prediction accuracy of the moving directions can be enhanced by taking into consideration, for example, a winker condition, a gear condition and/or a wiper condition, which are sensing results of the own vehicle condition sensor 3, and the like.

After predicting the moving directions of the object detected by the object detection section 2 and the own vehicle, the risk degree calculation section 4 determines whether there is a crossing or not between a movement line of the object (a prediction route on which the object moves prospectively) specified by a vector indicative of the moving direction of the object and a movement line of the own vehicle (a prediction route on which the own vehicle moves prospectively) specified by a vector indicative of the moving direction of the own vehicle.

When there is a crossing between the movement line of the object detected by the object detection section 2 and the movement line of the own vehicle, the risk degree calculation section 4 determines that the object possibly collides with the own vehicle, and makes larger the calculation value of its degree of risk.

Further, even when there is no crossing between the movement line of the object detected by the object detection section 2 and the movement line of the own vehicle, at a place where the distance between the two movement lines is less than a predetermined distance, there is a possibility of collision by a slight change in the moving direction, so that the calculation value of the degree of risk is made larger.

When the risk degree calculation section 4 calculates the degree of risk, the collision-risk target setting section 5 sets the object detected by the object detection section 2 as a collision-risk target on the basis of the degree of risk (Step ST5).

For example, when the degree of risk of the object calculated by the risk degree calculation section 4 is larger than a preset reference degree of risk, the corresponding object is set as a collision-risk target.

Note that the number of objects to be set as collision-risk targets by the collision-risk target setting section 5 may be any number, and when the collision-risk targets are set based on the degrees of risk of the objects, it suffices to preferentially set the object(s) with a high degree of risk as a collision-risk target (s), followed by setting the others as collision-risk targets up to the number preset as an upper limit. On this occasion, if the number goes beyond the upper limit because of the presence of a plurality of objects with the same degree of risk, the collision-risk targets may be set beyond the upper limit.

Further, the number of objects to be set as collision-risk targets by the collision-risk target setting section 5 may be determined on a case-by-case basis, for example, based on the time up to the collision of the vehicle with the object.

For example, the number of objects to be set as collision-risk targets may be adjusted according to an extension in time for the driver to deal with the collision-risk target.

Specifically, when there is an object with no enough time up to the collision, the number of the objects to be set as the collision-risk targets is decreased, and when there are only objects with enough time up to the collision, the number of the objects to be set as the collision-risk targets is increased.

This makes the driver find in advance a cause of the collision risk when there is enough time up to the collision, so that it becomes easier for him/her to eliminate the cause of the collision risk beforehand.

On the other hand, when there is no enough time up to the collision, it becomes possible to surely avoid the collision with a focus on the object of a high collision risk.

When the collision-risk target setting section 5 sets the collision-risk target, the warning image determination section 6 determines a size of the warning image that is an image for marking the collision-risk target, according to the degree of risk calculated by the risk degree calculation section 4 (Step ST6).

In Embodiment 1, a description will be made to a case of determining a size of a rectangle (frame) encompassing the collision-risk target as the size of the warning image.

For example, the warning image determination section 6 makes larger the size of the rectangle (frame) encompassing the collision-risk target as the degree of risk calculated by the risk degree calculation section 4 becomes higher.

An example of determining the rectangle size by the warning image determination section 6 will be specifically described below.

FIG. 3 to FIG. 6 are diagrams for illustrating examples of determining the rectangle size.

Figure 3:
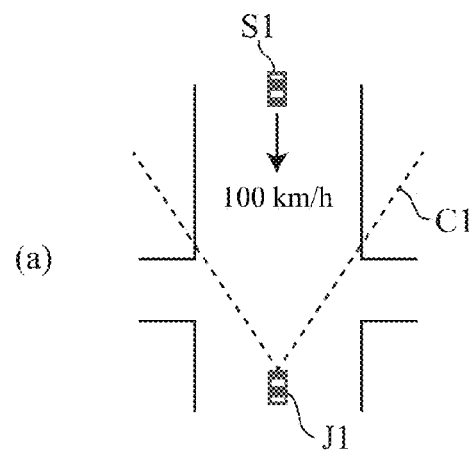
FIG. 3 is a diagram for illustrating an example of determining a rectangle size.
Figure 3:
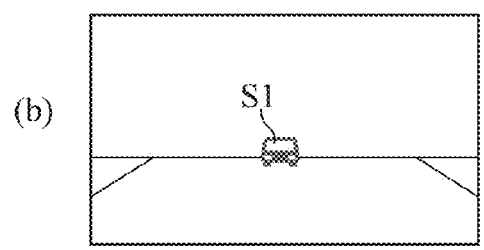
Figure 3:
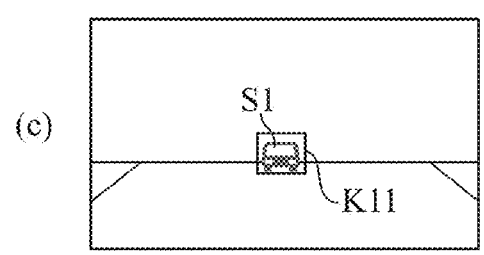
Figure 3:
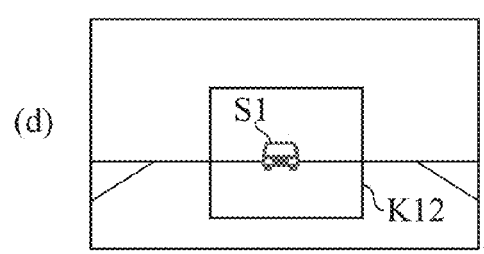

Shown at FIG. 3(*a*) is a state where there are an own vehicle J1 and another vehicle S1, and the video sensor 1 is sensing a region C1 while the other vehicle S1 running toward the own vehicle J1 at a speed of 100 km/h.

Shown at FIG. 3(*b*) is an image sensed by the video sensor 1.

Shown at FIG. 3(*c*) is an example of displaying a rectangle according to a conventional driving assistance device (example of displaying a rectangle K11 that encompasses the other vehicle S1 as a collision-risk target).

Shown at FIG. 3(*d*) is an example of displaying a rectangle according to the driving assistance device of Embodiment 1 (example of displaying a rectangle K12 that encompasses the other vehicle S1 as a collision-risk target).

Figure 4:
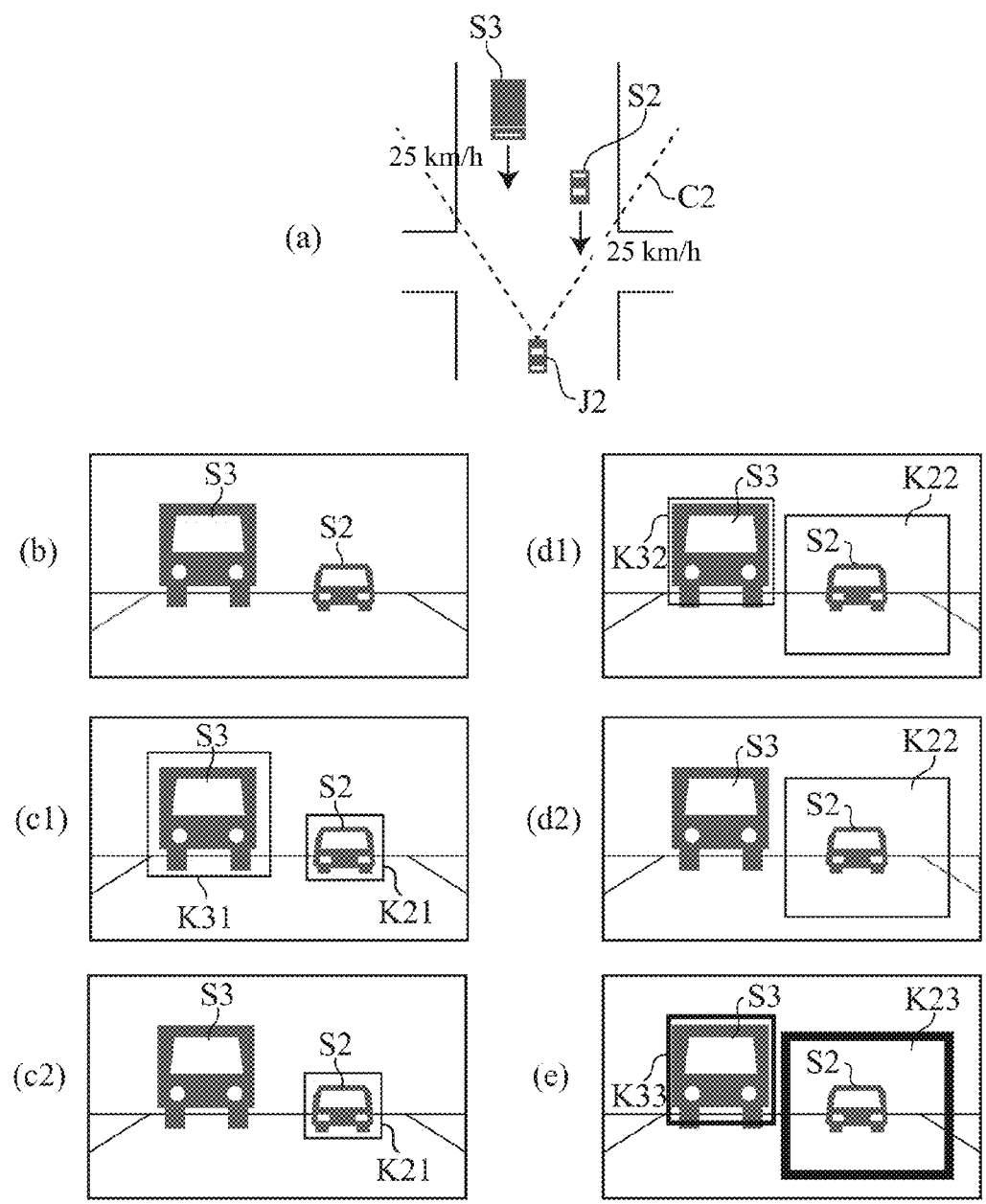
FIG. 4 is a diagram for illustrating another example of determining a rectangle size.

Shown at FIG. 4(*a*) is a state where there are an own vehicle J2 and other vehicles S2 and S3 (the other vehicle S2 is closer to the own vehicle J2 than the other vehicle S3, and the other vehicle S3 is a large vehicle), and the video sensor 1 is sensing a region C2 while the other vehicles S2, S3 running both at a speed of 25 km/h toward the own vehicle J2.

Shown at FIG. 4(*b*) is an image sensed by the video sensor 1.

Shown at FIGS. 4(*c*1), 4(*c*2) are examples of displaying rectangles according to a conventional driving assistance device, in which shown at FIG. 4(*c*1) is an example of displaying a rectangle K21 that encompasses the other vehicle S2 as a collision-risk target and a rectangle K31 that encompasses the other vehicle S3 as another collision-risk target. Shown at FIG. 4(*c*2) is an example of displaying a rectangle K21 that encompasses the other vehicle S2, assuming that the other vehicle S2 is only determined as a collision-risk target.

Shown at FIGS. 4(*d*1), (*d*2) are examples of displaying rectangles according to the driving assistance device of Embodiment 1, in which shown at FIG. 4(*d*1) is an example of displaying a rectangle K22 that encompasses the other vehicle S2 as a collision-risk target and a rectangle K32 that encompasses the other vehicle S3 as another collision-risk target. Shown at FIG. 4(*c*2) is an example of displaying a rectangle K22 that encompasses the other vehicle S2, assuming that the other vehicle S2 is only determined as a collision-risk target.

Figure 5:
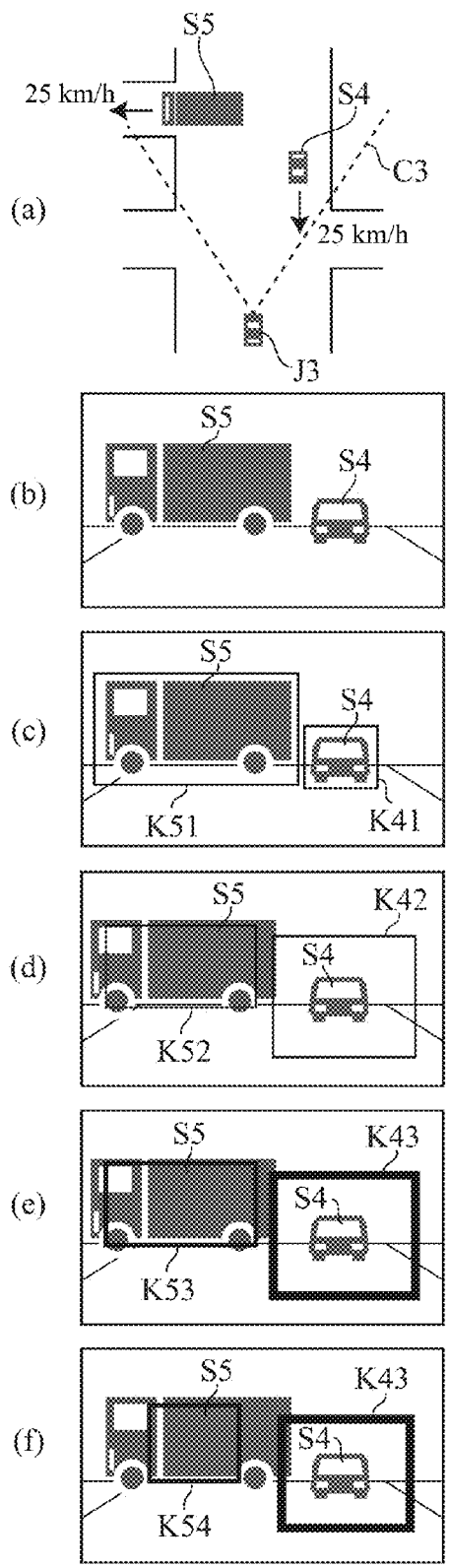
FIG. 5 is a diagram for illustrating another example of determining a rectangle size.

Shown at FIG. 5(*a*) is a state where there are an own vehicle J3 and other vehicles S4 and S5 (the other vehicle S4 is closer to the own vehicle J3 than the other vehicle S5, and the other vehicle S5 is a large vehicle), and the video sensor 1 is sensing a region C3 while the other vehicles S4, S5 running both at a speed of 25 km/h, provided that the other vehicle S5 is running along a path taken in a traverse direction viewed from the own vehicle J3 and the other vehicle S4 is running toward the own vehicle J3.

Shown at FIG. 5(*b*) is an image sensed by the video sensor 1.

Shown at FIG. 5(*c*) is an example of displaying a rectangle according to a conventional driving assistance device (example of displaying a rectangle K41 that encompasses the other vehicle S4 as a collision-risk target and a rectangle K51 that encompasses the other vehicle S5 as another collision-risk target).

Shown at FIG. 5(*d*) is an example of displaying a rectangle according to the driving assistance device of Embodiment 1 (an example of displaying a rectangle K42 that encompasses the other vehicle S4 as a collision-risk target and a rectangle K52 that encompasses the other vehicle S5 as another collision-risk target).

Figure 6:
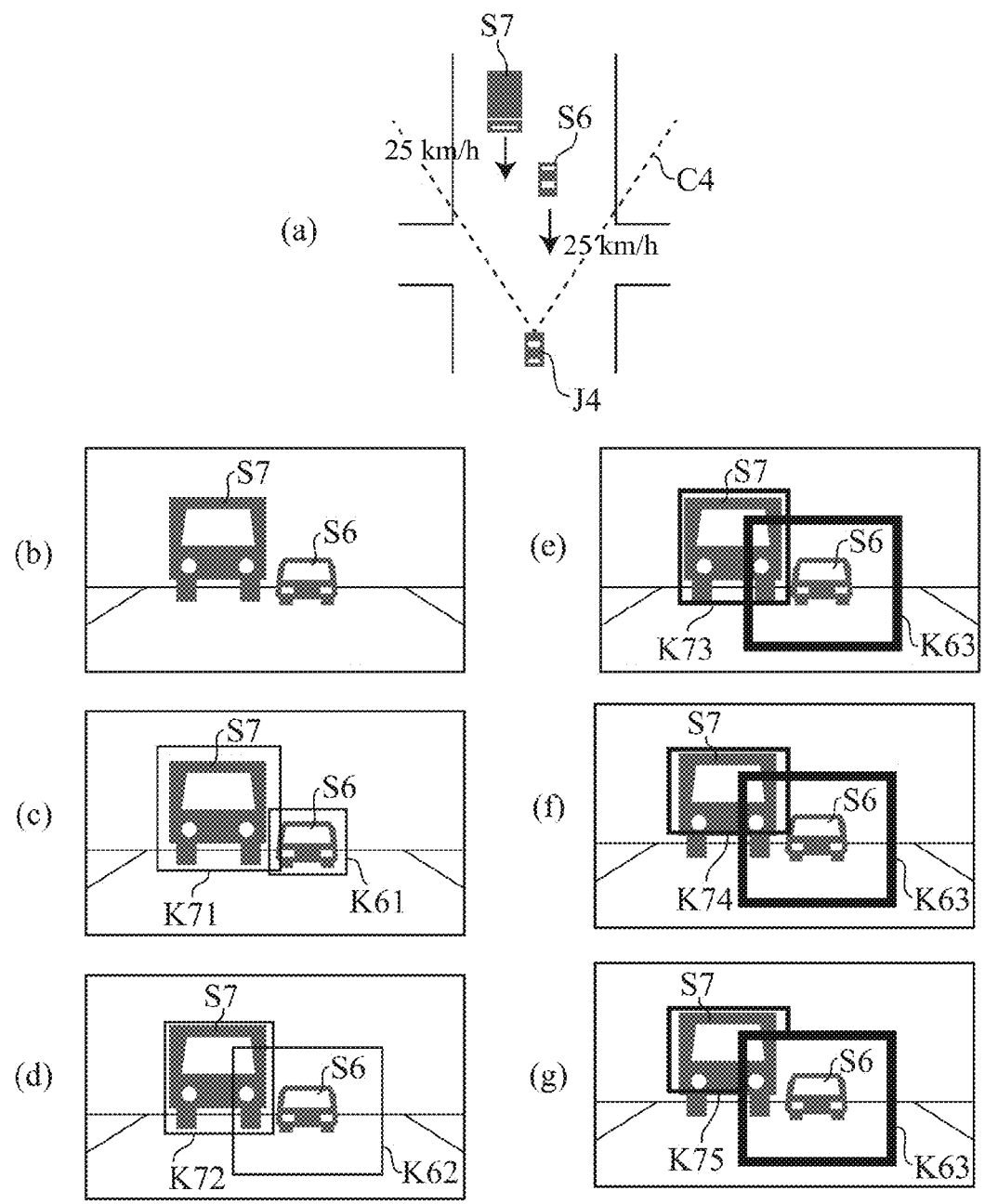
FIG. 6 is a diagram for illustrating another example of determining a rectangle size.

Shown at FIG. 6(*a*) is a state where there are an own vehicle J4 and other vehicles S6 and S7 (the other vehicle S6 is closer to the own vehicle J4 than the other vehicle S7, and the other vehicle S7 is a large vehicle), and the video sensor 1 is sensing a region C4 while the other vehicles S6, S7 running both at a speed of 25 km/h toward the own vehicle J4. However, the distance between the other vehicle S6 and the other vehicle S7 is shorter than the distance between the other vehicle S2 and the other vehicle S3 shown in FIG. 4, and they are closely located to each other.

Shown at FIG. 6(*b*) is an image sensed by the video sensor 1.

Shown at FIG. 6(*c*) is an example of displaying a rectangle according to a conventional driving assistance device (an example of displaying a rectangle K61 that encompasses the other vehicle S6 as a collision-risk target and a rectangle K71 that encompasses the other vehicle S7 as another collision-risk target).

Shown at FIG. 6(*d*) is an example of displaying a rectangle according to the driving assistance device of Embodiment 1 (an example of displaying a rectangle K62 that encompasses the other vehicle S6 as a collision-risk target and a rectangle K72 that encompasses the other vehicle S7 as another collision-risk target).

In the conventional driving assistance devices, generally, the rectangles as shown in FIG. 3(*c*), FIGS. 4(*c*1), 4(*c*2), FIG. 5(*c*) and FIG. 6(*c*) are displayed.

In the case of FIG. 3(*c*), although the image of the other vehicle S1 is small since the other vehicle S1 exists in the distance, it is approaching to the own vehicle J1 at a high speed of 100 km/hour.

Thus, merely by encompassing the other vehicle S1 as a collision-risk target with the rectangle K11, since the size of the rectangle K11 is small, a possibility arises that the driver, even if could find out the other vehicle S1, makes a misjudgment in a feeling of distance in consideration of the relative speed.

In contrast, according to Embodiment 1, even under a situation where the other vehicle S1 exists in the distance and thus the image of the other vehicle S1 is displayed small, because the size of the rectangle K12 is made larger as shown in FIG. 3(d) when the relative speed between the own vehicle J1 and the other vehicle S1 is high and thus the extension in time up to the collision is short, so that it is required to promptly deal with the risk (in the case of a high degree of risk), it is possible to reduce the possibility of misjudgment in a feeling of distance in consideration of the relative speed.

This makes the driver easily grasp a feeling of distance up to a collision-risk target in consideration of the relative speed, even when an object that appears to be small by the driver's eyes, such as a motorcycle, a small child, a small fallen object or the like, exists as the collision-risk target.

In the case of FIG. 4(c1), since the other vehicle S3 is a large vehicle, the image of the other vehicle S3 is displayed larger than the image of the other vehicle S2.

Thus, merely by encompassing the other vehicle S2 as a collision-risk target with the rectangle K21 and encompassing the other vehicle S3 as a collision-risk target with the rectangle K31, a possibility arises that the driver makes a misjudgment in a feeling of distance with respect to the other vehicles S2, S3.

That is, there is a risk that the driver focuses only on the larger image other vehicle S3, so that no attention is paid to the other vehicle S2.

Meanwhile, in the case of FIG. 4(c2), the other vehicle S2 of a high collision risk is only encompassed with the rectangle K21; however, even in this case, the image of the other vehicle S3 is displayed larger than the image of the other vehicle S2, so that a possibility arises that the driver makes a misjudgment in a feeling of distance with respect to the other vehicles S2, S3.

In contrast, according to Embodiment 1, even under a situation where the image of the other vehicle S2 is displayed smaller than the image of the other vehicle S3, because the size of the rectangle K22 encompassing the other vehicle S2 is made larger that the rectangle K32 encompassing the other vehicle S3 as shown in FIG. 4(d1) when the extension in time up to the collision with the other vehicle S2 is less than the extension in time up to the collision with the other vehicle S3 and it is required to promptly deal with the risk (in the case of a high degree of risk), it is possible to reduce the possibility of misjudgment in a feeling of distance in consideration of the relative speed.

This makes the driver easily grasp an object to which the driver has most to pay attention, even when the object that appears to be small by the driver's eyes, such as a motorcycle, a small child, a small fallen object or the like, exists with a large vehicle.

In the case of FIG. 5(c), like the case of FIG. 4(c1), since the other vehicle S5 is a large vehicle, the image of the other vehicle S5 is displayed larger than the image of the other vehicle S4. The other vehicle S5 is running along a path taken in a traverse direction viewed from the own vehicle J3, and thus is displayed much larger than the image of the other vehicle S3 shown in FIG. 4.

Thus, merely by encompassing the other vehicle S4 as a collision-risk target with the rectangle K41 and encompassing the other vehicle S5 as a collision-risk target with the rectangle K51, a possibility arises that the driver makes a misjudgment in a feeling of distance with respect to the other vehicles S4, S5.

That is, there is a risk that the driver focuses only on the larger image other vehicle S5, so that no attention is paid to the other vehicle S4.

In contrast, according to Embodiment 1, even under a situation where the image of the other vehicle S4 is displayed smaller than the image of the other vehicle S5, because the size of the rectangle K42 encompassing the other vehicle S4 is made larger that the rectangle K52 encompassing the other vehicle S5 as shown in FIG. 5(d) when the extension in time up to the collision with the other vehicle S4 is less than the extension in time up to the collision with the other vehicle S5 and it is required to promptly deal with the risk (in the case of a high degree of risk), it is possible to reduce the possibility of misjudgment in a feeling of distance in consideration of the relative speed.

This makes the driver easily grasp an object to which the driver has most to pay attention, even when the object that appears to be small by the driver's eyes, such as a motorcycle, a small child, a small fallen object or the like, exists with a large vehicle.

In the case of FIG. 6(c), in addition to the situation of FIG. 4(c1), the rectangle K61 encompassing the other vehicle S6 and the rectangle K71 encompassing the other vehicle S7 are partly overlapping each other, so that the visibility is impaired.

According to Embodiment 1, even under a situation where the image of the other vehicle S6 is displayed smaller than the image of the other vehicle S7, because the size of the rectangle K62 encompassing the other vehicle S6 is made larger that the rectangle K72 encompassing the other vehicle S7 as shown in FIG. 6(d) when the extension in time up to the collision with the other vehicle S6 is less than the extension in time up to the collision with the other vehicle S7 and it is required to promptly deal with the risk (in the case of a high degree of risk), it is possible to reduce the possibility of misjudgment in a feeling of distance in consideration of the relative speed.

Meanwhile, according to Embodiment 4 to be described later, it is configured so that, as shown in FIG. 6(g), high visibility is ensured even when a plurality of rectangles are partly overlapping each other (the details will be described later).

As described above, the warning image determination section makes larger the size of the rectangle encompassing the collision-risk target as the degree of risk calculated by the risk degree calculation section 4 becomes higher. Specifically, the size of the rectangle encompassing the collision-risk target is determined as follows.

First, the warning image determination section 6 specifies circumscribed rectangles of the collision-risk targets set by the object detection section 2.

The circumscribed rectangles of the collision-risk targets are, for example, respective shapes indicative of K11 in FIG. 3(c), K21 & K31 in FIG. 4(c1), K41 & K51 in FIG. 5(c), and K61 & K71 in FIG. 6(c).

Note that each circumscribed rectangle can be determined, for example, from an amount of characteristic of the edge line extracted by the object detection section 2.

Here, although the warning image determination section 6 is configured to specify the circumscribed rectangle of each collision-risk target, it may be configured to extract any given shape being preset in advance.

For example, when a camera is used as the video sensor 1, in the night or the like, there is also a case where the circumscribed rectangle of a collision-risk target is difficult to be specified. Further, when a plurality of collision-risk targets are closely placed, there is also a case where their edge lines cannot individually be obtained because the edge line of one of the collision-risk targets is hidden by another one of the collision-risk targets on the image acquired by the video sensor 1.

In such cases, any given shape being preset in advance may be extracted.

After specifying the circumscribed rectangle of a collision-risk target, the warning image determination section 6 determines as shown in following formulae (1) and (2) the size of a rectangle that encompasses the collision-risk target while keeping an aspect ratio of the circumscribed rectangle, by using, for example, a prediction time T up to the collision of the own vehicle with the collision-risk target that is calculated by the risk degree calculation section 4.

$$W=(a/T)+b \quad (1)$$

$$H=W*c \quad (2)$$

In the formula (1), W represents a lateral length of the rectangle, and H represents a longitudinal length of the rectangle.

Further, a and b represent preset coefficients, and c represents a ratio of the longitudinal length to the lateral length of the rectangle.

Here is shown the case where the warning image determination section 6 calculates the size of the rectangle by substituting the collision prediction time T calculated by the risk degree calculation section 4 into the formulae (1), (2); however, another case may be applied where a table is pre-prepared that shows a correspondence relation between collision prediction times and sizes of the rectangles, and the size of the rectangle corresponding to the collision prediction time T calculated by the risk degree calculation section 4 is specified with reference to the table.

In this way, respective sizes of the rectangle K12 in FIG. 3(*d*), the rectangles K22, K32 in FIG. 4(*d*1), the rectangle K22 in FIG. 4(*d*2), the rectangles K42, K52 in FIG. 5 (*d*) and the rectangles K62, K72 in FIG. 6(*d*), are determined.

When the warning image determination section 6 determines the sizes of rectangles encompassing the collision-risk targets set by the collision-risk target setting section 5, the display image generation section 7 superimposes each rectangle with the size determined by the warning image determination section 6 on the image acquired by the video sensor 1 at a position where each collision-risk target exists, to thereby generate a display image (an image in which the rectangles are superimposed at the positions where the collision-risk targets exist) (Step ST7).

When the display image generation section 7 generates the display image, the image display section 8 displays the display image on a display (for example, an instrument panel or a monitor of a car-navigation system) (Step ST8).

The rectangle is generally displayed so as to surround and enclose the collision-risk target; however, with respect, for example, to the other vehicle S5 shown in FIG. 5(*d*), the size of the rectangle K52 becomes smaller than the circumscribed rectangle of the other vehicle S5 because of its long extension in time up to the collision (collision prediction time T is long).

As is clear from the above, according to Embodiment 1, it is provided with the object detection section 2 that detects an object existing in a periphery of the own vehicle from the periphery image acquired by the video sensor 1; the risk degree calculation section 4 that calculates a degree of risk that the own vehicle collides with the object detected by the object detection section 2; and the collision-risk target setting section 5 that sets the object detected by the object detection section 2 as a collision-risk target on the basis of the degree of risk calculated by the risk degree calculation section 4; and is configured so that the warning image determination section 6 determines a size of the rectangle encompassing the collision-risk target set by the collision-risk target setting section 5, according to the degree of risk calculated by the risk degree calculation section 4. Thus, such an effect is achieved that the driver can be adequately informed of the presence of the object of a high collision risk.

That is, according to Embodiment 1, there is provided an effect that the driver can easily grasp a feeling of distance up to a collision-risk target in consideration of the relative speed, even when an object that appears to be small by the driver's eyes, such as a motorcycle, a small child, a small fallen object or the like, exists as the collision-risk target.

There is further provided an effect that the driver can easily grasp an object to which the driver has most to pay attention, even when the object that appears to be small by the driver's eyes exists with a large vehicle, Accordingly, even under a situation where the driver is likely to make misunderstanding in a feeling of distance, it becomes easy for him/her to properly grasp the feeling of distance. For example, a large vehicle with a high position tail lamp and light and a passenger vehicle exist as collision-risk targets in the night, the driver is likely to feel the large vehicle as if it is further away on the basis of the optical source position of the tail lamp or the light. According to Embodiment 1, however, since the rectangle is displayed with the size according to the collision prediction time T, it is possible to lessen misunderstanding of the driver.

Further, when there are the own vehicle and another vehicle running at the same speed toward the same traffic intersection, in some cases, the other vehicle is felt as if it is stopping; however, since the rectangle is displayed with the size according to the collision prediction time T, it is possible to easily determine the necessity to deal with the risk of collision.

In Embodiment 1, such a case is shown that the shape of the frame encompassing the collision-risk target set by the collision-risk target setting section 5 is a rectangle; however, the shape is not limited thereto, and the shape of the frame encompassing the collision-risk target may be a square, a precise circle, an ellipse or the like.

Further, the shape of the frame encompassing the collision-risk target may be selectable beforehand by the user from shapes of an arrow, square parentheses, fingers and the like. Namely, any shape may be used so long as it is for the purpose of informing of the presence of a collision-risk target, and is an image for warning of the collision-risk target.

Further, in Embodiment 1, such a case is shown where the image display section 8 displays the display image generated by the display image generation section 7 on a instrument panel or a monitor of a car-navigation system; however, this is not limitative. For example, by adding a driver sensor such as a camera etc., and an eye-point determination section to the configuration in FIG. 1, the rectangle with the size determined by the warning image determination section 6 may be displayed onto a head-up display that develops a display on a front window of the vehicle as being overlapped with a landscape ahead thereof, at the position where the collision-risk target exists.

In this case, the image acquired by the video sensor 1 and the rectangle are not synthesized together, and instead a position to be placed is determined for the rectangle with the size determined by the warning image determination section 6, and the image display section 8 displays the rectangle on the head-up display according to the determination by the warning image determination section 6.

Embodiment 2

In the above Embodiment 1, such a case is shown where the warning image determination section 6 makes larger the size of the rectangle encompassing the collision-risk target as the degree of risk calculated by the risk degree calculation section 4 becomes higher (for example, the prediction time T up to the collision of the own vehicle with the collision-risk target becomes shorter). However, in addition to this, the width of contour line of the rectangle may be made thicker as the collision prediction time T becomes shorter.

That is, the warning image determination section 6 determines as shown in a following formula (3) the width B of contour line of the rectangle encompassing the collision-risk target, by using the collision prediction time T calculated by the risk degree calculation section 4.

$$B=(d/T)+e \qquad (3)$$

In the formula (3), d and e represent preset coefficients.

Here is shown the case where the warning image determination section 6 calculates the width B of contour line of the rectangle by substituting into the formula (3) the collision prediction time T calculated by the risk degree calculation section 4; however, another case may be applied where a table is pre-prepared that shows a correspondence relation between collision prediction times and widths of contour lines of the rectangles, and the width of contour line corresponding to the collision prediction time T calculated by the risk degree calculation section 4 is specified with reference to the table.

In this way, respective widths of contour lines of, for example, the rectangles K23, K33 in FIG. 4(*e*), the rectangles K43, K53 in FIG. 5(*e*), the rectangles K43, K54 in FIG. 5(*f*), the rectangles K63, K73 in FIG. 6(*e*), the rectangles K63, K74 in FIG. 6(*f*), and the rectangles K63, K75 in FIG. 6(*g*), are determined.

By not only determining the size of the rectangle according to the collision prediction time T calculated by the risk degree calculation section 4, but also determining the width of contour line of the rectangle, it becomes possible to grasp a feeling of distance in consideration of the relative speed more easily than in Embodiment 1.

For example, in the case of FIG. 4(*e*), the width of contour line of the rectangle K23 is displayed thicker than the width of contour line of the rectangle K22 in FIG. 4(*d*1) (the rectangle K23 and the rectangle K22 have the same size).

This makes the driver feel the other vehicle S2 in FIG. 4(*e*) more approaching to the own vehicle J2 than the other vehicle S2 in FIG. 4(*d*1).

Further, in FIG. 4(*e*), since differences in size and in width of contour line between the rectangle K23 and the rectangle K33 are given according to the collision prediction time T calculated by the risk degree calculation section 4, it is possible to make the driver understand that he/she has to pay more attention to the other vehicle S2 than to the other vehicle S3.

In the case of FIG. 5(*e*), the width of contour line of the rectangle K43 is displayed thicker than the width of contour line of the rectangle K42 in FIG. 5 (*d*) (the rectangle K43 and the rectangle K42 have the same size).

This makes the driver feel the other vehicle S4 in FIG. 5(*e*) more approaching to the own vehicle J3 than the other vehicle S4 in FIG. 5(*d*).

Further, in FIG. 5(*e*), since differences in size and in width of contour line between the rectangle K43 and the rectangle K53 are given according to the collision prediction time T calculated by the risk degree calculation section 4, it is possible to make the driver understand that he/she has to pay more attention to the other vehicle S4 than to the other vehicle S5.

In the case of FIG. 6(*e*), the width of contour line of the rectangle K63 is displayed thicker than the width of contour line of the rectangle K62 in FIG. 6(*d*) (the rectangle K63 and the rectangle K62 have the same size).

This makes the driver feel the other vehicle S6 in FIG. 6(*e*) more approaching to the own vehicle J4 than the other vehicle S6 in FIG. 6(*d*).

Further, in FIG. 6(*e*), since differences in size and in width of contour line between the rectangle K63 and the rectangle K73 are given according to the collision prediction time T calculated by the risk degree calculation section 4, it is possible to make the driver understand that he/she has to pay more attention to the other vehicle S6 than to the other vehicle S7.

Embodiment 3

In Embodiments 1 and 2 described above, such cases are shown where the warning image determination section 6 makes larger the size of the rectangle encompassing the collision-risk target as the degree of risk calculated by the risk degree calculation section 4 becomes higher (for example, the prediction time T up to the collision of the own vehicle with the collision-risk target becomes shorter). However, when a plurality of the collision-risk targets are set by the collision-risk target setting section 5, the shapes of the rectangles that encompassing the plurality of the collision-risk targets may be commonized so that the size of the rectangle with a commonized shape is determined for each collision-risk target according to the collision prediction time T calculated by the risk degree calculation section 4.

For example, in the case of FIG. 5(*e*), the rectangle K43 and the rectangle K53 are different in aspect ratio, and thus different in shape. Accordingly, at first glance, it is unable in some cases to understand which is larger in the rectangle K43 and the rectangle K53.

Thus, in Embodiment 3, as shown in FIG. 5(*f*), the rectangle K43 and the rectangle K54 are made the same in aspect ratio, thus being commonized in shape.

Since the rectangle K43 and the rectangle K54 have the same shape, it is possible at first glance to understand which is larger in the rectangle K43 and the rectangle K53.

As a method of commonizing the shape, for example, such a method or the like is conceivable in which the shape of the rectangle encompassing the collision-risk target whose degree of risk is highest (the collision prediction time T is shortest) is selected among the shapes of the rectangles encompassing the plurality of the collision-risk targets, followed by replacing each of the shapes of the rectangles encompassing the other collision-risk targets, with the selected shape.

That is, the aspect ratios of the shapes of the rectangles encompassing the other collision-risk targets are made the same as the aspect ratio of the rectangle encompassing the collision-risk target whose collision prediction time T is shortest, followed by determining sizes and/or widths of contour lines of the rectangles encompassing the other collision-risk targets, according to the collision prediction times T of the other collision-risk targets.

In Embodiment 3, such a case is shown where the shapes of the frames encompassing the collision-risk targets are commonized by making uniform the aspect ratios of the plurality of the rectangles. However, the shapes of the frames encompassing the collision-risk targets may be commonized, for example, into a shape of a square, a precise circle, an ellipse, an arrow, square parentheses, fingers or the like. Namely, any shape may be used so long as it is for the purpose of informing of the presence of a collision-risk target, and is an image for warning of the collision-risk target.

However, in the case of commonizing into an ellipse as a shape of the frame encompassing the collision-risk target, it is required to make uniform the aspect ratios of the ellipses.

Embodiment 4

In Embodiments 1 to 3 described above, such cases are shown where, when a plurality of the collision-risk targets are set by the collision-risk target setting section 5, the size of the rectangle is determined for each of the collision-risk targets according to the degree of risk (for example, the prediction time T up to the collision of the own vehicle with the collision-risk target) calculated by the risk degree calculation section 4. In these cases, however, the plurality of the rectangles are displayed in some cases at their partly overlapping positions (for example, see FIG. 6(e)).

In Embodiment 4, when a plurality of the rectangles are to be displayed at their partly overlapping positions, among the rectangles encompassing the plurality of the collision-risk targets, the warning image determination section 6 modifies the shape of the rectangle encompassing the collision-risk target that is lower in the degree of risk calculated by the risk degree calculation section 4 (longer in the collision prediction time T) than the other target, to thereby eliminate the overlapping of the plurality of the rectangles (for example, see FIG. 6(g)).

In the case of FIG. 6(e), since the rectangle K73 encompassing the other vehicle S7 that is the collision-risk target being longer in the collision prediction time T than the other target, is overlapping at its lower right portion with the rectangle K63 encompassing the other vehicle S6, the lower right portion of the rectangle K73 is cut out to be modified into such a shape of K75 shown in FIG. 6(g).

As in the case of FIG. 6(e), when a plurality of the rectangles are displayed at their partly overlapping positions, visibility is impaired. However, by modifying one of the shapes of the rectangles to thereby eliminate the overlapping of the plurality of the rectangles as in FIG. 6(g), the image of the other vehicle S6 encompassed with the rectangle K63 becomes more highlighted than the image of the other vehicle S7 encompassed with the rectangle K75 whose overlapping portion has been cut out. Thus, it is possible to make the driver understand that he/she has to pay more attention to the other vehicle S6 than to the other vehicle S7.

Further, as to a positional relationship between the rectangle K63 and the rectangle K75 (which one is placed on the near side or the deep side viewed by the driver), since the rectangle K75 has been cut out, the rectangle K63 is displayed as if it exists more closer to the driver. That is, it is possible to make the driver understand that he/she has to pay more attention to the other vehicle S6 encompassed with the rectangle K63.

In Embodiment 4, such a case is shown where, when a plurality of the rectangles are to be displayed at their partly overlapping positions, among the rectangles encompassing the plurality of the collision-risk targets, the rectangle encompassing the collision-risk target that is lower in the degree of risk calculated by the risk degree calculation section 4 (longer in the collision prediction time T) than the other target, is modified in shape, to thereby eliminate the overlapping of the plurality of the rectangles. However, the warning image determination section 6 may instead translucently display an image indicative of the overlapping portion in the warning image for marking the collision-risk target being longer in the collision prediction time T calculated by the risk degree calculation section 4. This makes it possible to achieve an effect similar to the above.

In the case of FIG. 6(e), since the rectangle K73 encompassing the other vehicle S7 that is the collision-risk target being longer in the collision prediction time T, is overlapping at its lower right portion with the rectangle K63 encompassing the other vehicle S6, the transmittance of the lower right portion of the rectangle K73 is changed so that its image is displayed translucently.

Embodiment 5

In Embodiment 1 to 4 described above, such cases are shown where the warning image determination section 6 makes larger the size of the rectangle encompassing the collision-risk target as the degree of risk calculated by the risk degree calculation section 4 becomes higher (for example, the prediction time T up to the collision of the own vehicle with the collision-risk target becomes shorter). However, in Embodiment 5, such a case will be described where, when a plurality of the collision-risk targets are set by the collision-risk target setting section 5, the risk degree calculation section 4 calculates each degree of risk taking further into consideration, types of the plural collision-risk targets, actions of the plural collision-risk targets and the own vehicle, and/or a road configuration stored in a not-shown map database; then the warning image determination section 6 assigns priorities for the plural collision-risk targets according to their degrees of risk calculated by the collision-risk target setting section 5, to thereby make larger the size of the rectangle or make thicker the width of contour line of the rectangle as the priority of the collision-risk target encompassed with the rectangle becomes higher. Instead, the image of the collision-risk target may be enlarged as the priority becomes higher.

At the time of determining the size of the rectangle or the width of contour line of the rectangle, by calculating the degree of risk on the basis of the type of the collision-risk target, the actions of the collision-risk target and the own vehicle, and/or the road configuration in addition to the collision prediction time T calculated by the risk degree calculation section 4, followed by assigning a priority on the basis of the degree of risk, it is possible for the driver to be informed of the presence of the object of a high collision risk, more adequately than in Embodiments 1 to 4.

For example, priorities are assigned for the plurality of the collision-risk targets as follows.

(1) Type of Collision-Risk Target

While conceivable types of the collision-risk targets include a passenger vehicle, a motorcycle, a bicycle, a pedestrian (human), a motionless object and the like, a table is prepared beforehand in which factors α indicative of the priorities corresponding to the types of the collision-risk targets are memorized.

For example, when the collision-risk targets are a passenger vehicle and a pedestrian, the priority for the case of the human is made higher than the priority for the case of the passenger vehicle.

Specifically, in the case of the collision-risk target being the passenger vehicle, the factor α is set to "1.0", for example, and in the case of the collision-risk target being the human, the factor α is set to "0.9".

Here is assumed that the smaller the factor α becomes, the higher the priority is given.

(2) Actions of Collision-Risk Target and Own Vehicle

Examples of the actions of the collision-risk target and the own vehicle include a steering angle, a winker condition, a gear condition, a wiper condition, which are sensing results of the own vehicle condition sensor 3, and the like.

By taking into consideration the steering angle, the winker condition, the road configuration stored in the map database, or the like, the moving directions of the collision-risk target and the own vehicle can be predicted as also mentioned in Embodiment 1.

When there is a crossing between a movement line of the collision-risk target specified by a vector indicative of a moving direction of the collision-risk target and a movement line of the own vehicle specified by a vector indicative of a moving direction of the own vehicle, the priority β for the collision-risk target is made higher.

Specifically, when there is a crossing between the movement line of the collision-risk target and the movement line of the own vehicle, a factor β is set to "0.8", for example, and when there is no crossing between the movement line of the collision-risk target and the movement line of the own vehicle, the factor β is set to "0.9" if there is a place where the distance between the movement lines is less than a predetermined distance, or the factor β is set to "1.0" if there is no place where the distance between the movement lines is less than the predetermined distance.

Here is assumed that the smaller the factor β becomes, the higher the priority is given.

After setting the factors α and β for indicating the priorities, the warning image determination section 6 multiplies the collision prediction time T calculated by the risk degree calculation section 4 by the factors α, β, and thereafter, determines the size of the rectangle encompassing the collision-risk target, similarly to Embodiments 1 to 4, on the basis of the collision prediction time $T_{\alpha,\beta}$ after multiplication by the factors. Meanwhile, the warning image determination section determines the width of contour line of the rectangle on the basis of the collision prediction time $T_{\alpha,\beta}$.

$$T_{\alpha,\beta}=T*\alpha*\beta \tag{4}$$

As is clear from the above, according to Embodiment 5, it is configured so that when a plurality of the collision-risk targets are set by the collision-risk target setting section 5, priorities are assigned for the plurality of the collision-risk targets taking into consideration types of the plural collision-risk targets, actions of the plural collision-risk targets and the own vehicle, and/or a road configuration, and the size of the rectangle is made larger or the width of contour line of the rectangle is made thicker as the priority of the collision-risk target encompassed with the rectangle becomes higher. Thus, such an effect is achieved that the driver can be informed of the presence of the object of a high collision risk, more adequately than in Embodiments 1 to 4.

Embodiment 6

In Embodiment 1 to 4, such cases are shown where the warning image determination section 6 makes larger the size of the rectangle encompassing the collision-risk target as the degree of risk calculated by the risk degree calculation section 4 becomes higher (for example, the prediction time T up to the collision of the own vehicle with the collision-risk target becomes shorter). However, in Embodiment 6, such a case will be described where, when a plurality of the collision-risk targets are set by the collision-risk target setting section 5, the display image generation section 7 further modifies the image of the collision-risk target or the rectangle encompassing the above collision-risk target (warning image for marking the collision-risk target) according to the priority.

Specifically, the image of the collision-risk target or the rectangle encompassing the above collision-risk target is modified by a following method of (1) or (2).

(1) Modification of Size or Contour Line of Rectangle Encompassing Collision-Risk Target For example, when two collision-risk targets are set by the collision-risk target setting section 5, the size of the rectangle encompassing an image of the collision-risk target that is higher in priority than the other is enlarged by a predetermined magnification ratio, or the width of contour line of the rectangle is enlarged by a predetermined magnification ratio.

For example, when three collision-risk targets are set by the collision-risk target setting section 5, the size of the rectangle encompassing an image of the collision-risk target that is highest in priority is enlarged by a magnification ratio of A (A>1.0) (or, the width of contour line of the corresponding rectangle is enlarged by the magnification ratio A), and the size of the rectangle encompassing an image of the collision-risk target that is next highest in priority is enlarged by a magnification ratio of B smaller than the magnification ratio A (A>B>1.0) (or, the width of contour line of the rectangle is enlarged by the magnification ratio B).

Here is shown the case where the size of the rectangle encompassing the image of the collision-risk target that is next highest in priority is enlarged by a magnification ratio of B; however, the size of this rectangle may not be enlarged so that only the rectangle encompassing the image of the collision-risk target that is highest in priority is enlarged.

(2) Modification of Image of Collision-Risk Target

For example, when two collision-risk targets are set by the collision-risk target setting section 5, from the image acquired by the video sensor 1, an image of the collision-risk target that is higher in priority than the other target is extracted, and then the image is enlarged by a given magnification ratio, followed by synthesizing the enlarged image with the image acquired by the video sensor 1.

For example, when three collision-risk targets are set by the collision-risk target setting section 5, an image of the collision-risk target that is highest in priority and an image of the collision-risk target that is next highest in priority are extracted, and in these images, the image of the collision-risk target that is higher in priority than the other target is enlarged by a magnification ratio of A (A>1.0) and the image of the collision-risk target that is next high in priority is enlarged by a magnification ratio of B smaller than the magnification ratio A (A>B>1.0).

Then, the two enlarged images are synthesized with the image acquired by the video sensor 1.

It is noted, however, that the method (2) is limited to be applied in the case of making a display on an instrument panel or a monitor of a car navigation system.

As is clear from the above, according to Embodiment 6, it is configured so that when a plurality of the collision-risk targets are set by the collision-risk target setting section 5, the display image generation section 7 modifies the image of the collision-risk target or the rectangle encompassing the above collision-risk target, according to the priority. Thus, such an effect is achieved that the driver can be informed of the presence of the object of a high collision risk, more adequately than in Embodiments 1 to 4.

Embodiment 7

In the above Embodiment 6, such a case is shown where the display image generation section 7 modifies the image of the collision-risk target or the rectangle encompassing the above collision-risk target, according to the priority. However, the display image generation section 7 may modify an image other than the image of the collision-risk target according to the priority, and by doing so, it is possible to achieve an effect similar to in Embodiment 6.

For example, when two collision-risk targets are set by the collision-risk target setting section 5, images other than the image of the collision-risk target that is higher in priority (an image of the collision-risk target that is lower in priority, a landscape image, etc.) are reduced in color contrast. Instead, the images other than the image of the collision-risk target that is higher in priority are blurred.

It should be noted that unlimited combination of the respective embodiments, modification of any configuration element in the embodiments and omission of any configuration element in the embodiments may be made in the present invention without departing from the scope of the invention.

INDUSTRIAL APPLICABILITY

The driving assistance device according to the invention is suited for a passenger vehicle that requires to have a function to obviate an accident by adequately informing the driver of the presence of an obstacle existing in a periphery of the vehicle.

DESCRIPTION OF REFERENCE NUMERALS

1: video sensor (image acquisition unit), 2: object detection section (collision-risk target setting unit), 3: own vehicle condition sensor (risk degree calculation unit), 4: risk degree calculation section (risk degree calculation unit), 5: collision-risk target setting section (collision-risk target setting unit), 6: warning image determination section (warning image determination unit), 7: display image generation section (image display unit), 8: image display section (image display unit).

The invention claimed is:

1. A driving assistance device, comprising:
   an image acquisition unit that acquires a periphery image of an own vehicle;
   an object detection unit that detects an object existing in a periphery of the own vehicle from the periphery image acquired by the image acquisition unit;
   a risk degree calculation unit that calculates a degree of risk that the own vehicle collides with the object detected by the object detection unit;
   a collision-risk target setting unit that sets the object detected by the object detection unit as a collision-risk target on the basis of the degree of risk calculated by the risk degree calculation unit;
   a warning image determination unit that determines a size of a warning image that is an image for marking the collision-risk target set by the collision-risk target setting unit, according to the degree of risk calculated by the risk degree calculation unit; and
   an image display unit that displays the warning image having the size determined by the warning image determination unit at a position where the collision-risk target set by the collision-risk target setting unit exists,
   wherein when a plurality of the collision-risk targets are set by the collision-risk target setting unit and warning images for marking the plurality of collision-risk targets are to be displayed at positions where said warning images overlap with each other, the warning image determination unit modifies an overlapped portion of the warning image for marking the collision-risk target that is lower than the other target in the degree of risk calculated by the risk degree calculation unit.

2. The driving assistance device according to claim 1, wherein the warning image determination unit makes the size of the warning image larger as the degree of risk calculated by the risk degree calculation unit becomes higher.

3. The driving assistance device according to claim 1, wherein the warning image determination unit makes a contour line of the warning image thicker as the degree of risk calculated by the risk degree calculation unit becomes higher.

4. The driving assistance device according to claim 1, wherein when a plurality of the collision-risk targets are set by the collision-risk target setting unit, the warning image determination unit commonizes shapes of the warning images for marking the plurality of collision-risk targets, and determines each size of the warning images commonized in shape for every collision-risk target, according to the degree of risk calculated by the risk degree calculation unit.

5. The driving assistance device according to claim 1, where the warning image determination unit translucently displays the overlapped portion of the warning image to be modified.

6. The driving assistance device according to claim 1, wherein when a plurality of the collision-risk targets are set by the collision-risk target setting unit, the warning image determination unit assigns priorities for the plurality of the collision-risk targets in consideration of their degrees of risk calculated by the risk degree calculation unit, and enlarges an image of the collision-risk target that is higher in priority than the other target, or enlarges the warning image for marking said collision-risk target.

7. The driving assistance device according to claim 1, wherein the risk degree calculation unit calculates from a distance and a relative speed between the object detected by the object detection unit and the own vehicle, a collision prediction time up to the collision of the own vehicle with the object, to thereby calculate the degree of risk on the basis of the collision prediction time.

8. The driving assistance device according to claim 1, wherein the risk degree calculation unit predicts moving directions of the object detected by the object detection unit and the own vehicle, and calculates from the moving directions a possibility that the object and the own vehicle collide with each other, to thereby calculate the degree of risk on the basis of the possibility.

9. The driving assistance device according to claim 1, wherein the risk degree calculation unit predicts moving directions of the object detected by the object detection unit and the own vehicle in consideration of a road configuration stored in a map database, and calculates from the moving directions a possibility that the object and the own vehicle collide with each other, to thereby calculate the degree of risk on the basis of the possibility.

10. The driving assistance device according to claim 1, wherein the risk degree calculation unit calculates the degree of risk on the basis of one or more of a location of the object detected by the object detection unit, a location of the own vehicle, a speed of the object detected by the object detection unit, a speed of the own vehicle, a moving direction of the object detected by the object detection unit, a moving direction of the own vehicle, and a map data stored in a map database.

11. The driving assistance device according to claim 1, wherein when a plurality of the collision-risk targets are set by the collision-risk target setting unit, the image display unit assigns priorities for the plurality of the collision-risk targets in consideration of their degrees of risk calculated by the risk degree calculation unit, and modifies an image of the collision-risk target in the image acquired by the image acquisition unit, or the warning image for marking said collision-risk target, according to the priority.

12. The driving assistance device according to claim 11, wherein when a plurality of the collision-risk targets are set by the collision-risk target setting unit, the image display unit assigns priorities for the plurality of the collision-risk targets in consideration of their degrees of risk calculated by the risk degree calculation unit, and enlarges the image of the collision-risk target that is higher in priority than the other target, or enlarges the warning image for marking said collision-risk target.

13. The driving assistance device according to claim 1, wherein when a plurality of the collision-risk targets are set by the collision-risk target setting unit, the image display unit assigns priorities for the plurality of the collision-risk targets in consideration of their degrees of risk calculated by the risk degree calculation unit, and modifies an image other than an image of the collision-risk target in the image acquired by the image acquisition unit, according to the priority.

14. The driving assistance device according to claim 13, wherein when a plurality of the collision-risk targets are set by the collision-risk target setting unit, the image display unit assigns priorities for the plurality of the collision-risk targets in consideration of their degrees of risk calculated by the risk degree calculation unit, and performs on the image other than the image of the collision-risk target that is higher in priority than the other target, color-contrast reduction processing or blur processing.

15. The driving assistance device according to claim 1, wherein the warning image determination unit is configured to cut out the overlapped portion of the warning image to be modified.

16. A driving assistance method, comprising:
an image acquisition processing step in which an image acquisition unit acquires a periphery image of an own vehicle;
an object detection processing step in which an object detection unit detects an object existing in a periphery of the own vehicle from the periphery image acquired by the image acquisition processing step;
a risk degree calculation processing step in which a risk degree calculation unit calculates a degree of risk that the own vehicle collides with the object detected by the object detection processing step;
a collision-risk target setting processing step in which a collision-risk target setting unit sets the object detected by the object detection processing step as a collision-risk target on the basis of the degree of risk calculated by the risk degree calculation processing step;
a warning image determination processing step in which a warning image determination unit determines a size of a warning image that is an image for marking the collision-risk target set by the collision-risk target setting processing step, according to the degree of risk calculated by the risk degree calculation processing step; and
an image display processing step in which an image display unit displays the warning image having the size determined by the warning image determination processing step at a position where the collision-risk target set by the collision-risk target setting processing step exists,
wherein in the warning image determination processing step, when a plurality of the collision-risk targets are set in the collision-risk target setting processing step and warning images for marking the plurality of collision-risk targets are to be displayed at positions where said warning images overlap with each other, the warning image determination unit modifies a shape of the warning image for marking the collision-risk target that is lower than the other target in the degree of risk calculated in the risk degree calculation processing step.

17. The driving assistance method according to claim 16, wherein the overlapped portion of the warning image to be modified is translucently displayed in the warning image determination processing step.

18. The driving assistance method according to claim 16, wherein the overlapped portion of the warning image to be modified is cut out in the warning image determination processing step.

* * * * *